United States Patent
Partani et al.

(10) Patent No.: US 8,375,115 B2
(45) Date of Patent: Feb. 12, 2013

(54) METHODS, APPARATUS, AND SYSTEMS FOR INTEGRATED MANAGEMENT, GRAPHICS AND I/O CONTROL OF SERVER SYSTEMS

(75) Inventors: Dwarka Partani, San Jose, CA (US); Sujith Arramreddy, San Jose, CA (US)

(73) Assignee: Emulex Corporation, Costa Mesa, CA (US)

( * ) Notice: Subject to any disclaimer, the term of this patent is extended or adjusted under 35 U.S.C. 154(b) by 842 days.

(21) Appl. No.: 12/030,963

(22) Filed: Feb. 14, 2008

(65) Prior Publication Data

US 2008/0282117 A1 Nov. 13, 2008

Related U.S. Application Data (60) Provisional application No. 60/890,405, filed on Feb. 16, 2007.

(51) Int. Cl.
G06F 15/173 (2006.01)
(52) U.S. Cl. ......... 709/223; 709/224; 709/225; 713/310
(58) Field of Classification Search .......... 709/223–225; 713/310
See application file for complete search history.

(56) References Cited

U.S. PATENT DOCUMENTS

| | | | |
|---|---|---|---|
| 5,812,820 A | 9/1998 | Loram | |
| 6,054,823 A * | 4/2000 | Collings et al. | 318/400.04 |
| 6,157,989 A * | 12/2000 | Collins et al. | 711/151 |
| 6,163,849 A * | 12/2000 | Nouri et al. | 713/324 |
| 6,329,833 B1 * | 12/2001 | Wu | 324/762.03 |
| 6,378,009 B1 | 4/2002 | Pinkston, II et al. | |
| 6,378,014 B1 | 4/2002 | Shirley | |
| 6,388,658 B1 | 5/2002 | Ahern et al. | |
| 6,476,854 B1 | 11/2002 | Emerson et al. | |
| 6,487,082 B1 * | 11/2002 | Crapisi et al. | 361/760 |
| 6,567,869 B2 | 5/2003 | Shirley | |
| 6,671,756 B1 | 12/2003 | Thomas et al. | |
| 6,672,896 B1 | 1/2004 | Li | |
| 6,681,250 B1 | 1/2004 | Thomas et al. | |
| 6,710,790 B1 | 3/2004 | Fagioli | |
| 6,798,287 B2 * | 9/2004 | Wu et al. | 330/129 |
| 6,915,362 B2 | 7/2005 | Ramsey et al. | |
| 6,931,475 B2 | 8/2005 | Huang et al. | |
| 6,961,798 B2 | 11/2005 | Ferguson | |
| 7,228,345 B2 * | 6/2007 | Larson et al. | 709/222 |
| 7,403,204 B2 * | 7/2008 | Emerson et al. | 345/545 |
| 7,424,419 B1 | 9/2008 | Fike et al. | |

(Continued)

OTHER PUBLICATIONS

Hewlett-Packard Development Company, LP; "Integrated Lights-Out Virtual Serial Port Configuration and Operation". HOWTO, 2nd edition, 2005, 20 pages. Hewlett-Packard Development Company, LP.

(Continued)

*Primary Examiner* — Duyen Doan
(74) *Attorney, Agent, or Firm* — Alford Law Group, Inc.; William E. Alford (57) ABSTRACT

In one embodiment of the invention, a server system is disclosed for data processing having a printed circuit board with one or more processors to process data; a network interface controller coupled to the one or more processors; and a monolithic integrated circuit (IC) coupled to the one or more processors and the network interface controller. The network interface controller couples the server system to a network for remote client access to the server system. The monolithic integrated circuit couples a remote computer system to the server system via the network. The remote computer system includes a remote storage device, a remote display, a remote keyboard, and a remote mouse to allow remote control and management of the server system.

36 Claims, 3 Drawing Sheets

U.S. PATENT DOCUMENTS

| | | | |
|---|---|---|---|
| 7,447,995 B2 | 11/2008 | Luciani, Jr. et al. | |
| 7,502,878 B1 | 3/2009 | Wright | |
| 7,519,747 B1 | 4/2009 | Cory et al. | |
| 7,519,749 B1* | 4/2009 | Sivertsen | 710/73 |
| 7,817,157 B2* | 10/2010 | Emerson et al. | 345/537 |
| 7,827,258 B1 | 11/2010 | Kalbarga | |
| 7,861,171 B2 | 12/2010 | Johanson et al. | |
| 2003/0084133 A1* | 5/2003 | Chan et al. | 709/222 |
| 2004/0215991 A1* | 10/2004 | McAfee et al. | 713/324 |
| 2005/0228980 A1* | 10/2005 | Brokish et al. | 713/2 |
| 2006/0023384 A1* | 2/2006 | Mukherjee et al. | 361/103 |
| 2006/0164406 A1 | 7/2006 | Emerson et al. | |
| 2006/0168099 A1 | 7/2006 | Diamant | |
| 2006/0242438 A1* | 10/2006 | Baba et al. | 713/300 |
| 2006/0248360 A1* | 11/2006 | Fung | 713/300 |
| 2006/0294398 A1* | 12/2006 | Morris et al. | 713/300 |
| 2007/0101173 A1* | 5/2007 | Fung | 713/300 |
| 2007/0244684 A1* | 10/2007 | Murugan et al. | 703/14 |

OTHER PUBLICATIONS

"Remote access eliminates 'house calls'" 2004. Communications News. 2 pages. http://www.comnews.com/stories/articles/1104/1104remote_access.htm.

Shilmover, B. "Hardware Management in Microsoft Windows Server 2003 R2 RCO" Part 1 and 3. 2007 Microsoft Corporation. 17 pages.

Zhuo, H.; Yin, J.; Rao,A. "Remote Management with the Baseboard Management Controller in Eighth-Generation Dell PowerEdge Servers" Dell Power Solutions. 2004. p. 26-29.

\* cited by examiner

METHODS, APPARATUS, AND SYSTEMS FOR INTEGRATED MANAGEMENT, GRAPHICS AND I/O CONTROL OF SERVER SYSTEMS

CROSS-REFERENCE TO RELATED APPLICATIONS

This patent application claims the benefit of U.S. Provisional Patent Application No. 60/890,405 filed on Feb. 16, 2007 by inventors Dwarka Partani et al., entitled INTEGRATED MANAGEMENT, GRAPHICS AND I/O CONTROL FOR SERVER SYSTEMS.

FIELD

The embodiments of the invention relate relate to server management, graphics control, and input/output control of computer server systems.

BACKGROUND

When powered on, computer server systems can be readily managed from remote locations. However, oftentimes a computer server system requires powering off and powering back on such as when new software has been loaded, for example. Current remote server management systems do not provide the capability of powering down a computer server system from a remote location. An information technology support person has to physically switch off the computer server system and then switch it back on. Moreover, the typical keyboard-video-mouse (KVM) remote operating technology samples an analog video signal to acquire video frames of the video monitor and then daisy chains the analog video signal to a video monitor using expensive external KVM cables. Constantly sampling the analog video signal with an analog to digital converter wastes power. Additionally with a plurality servers in a server farm, a plurality of external KVM cables may be employed which is expensive and may cause considerable cable clutter around the back of the server farm.

Moreover, the typical keyboard-video-mouse (KVM) remote operating technology is not well integrated, utilizing an extra graphics controller with its own frame buffer memory to transfer each frame of video data to a remote monitor. The extra graphics controller and frame buffer memory uses additional power and is an added cost to the server system. The additional power consumption and costs may quickly add up when a plurality of servers are installed in a server farm.

Additionally, operating, administering, and maintaining a server system can be a significant cost of the total cost of ownership of a server system that is desirable to reduce.

BRIEF SUMMARY

The embodiments of the invention are summarized by the claims that follow below.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

The embodiments of the invention include a method, apparatus and system for integrated server management, graphics control, input/output control, remote keyboard-video-mouse control, and remote storage.

In one embodiment of the invention, a server system is disclosed for data processing having a printed circuit board with one or more processors to process data; a network interface controller coupled to the one or more processors; and a monolithic integrated circuit (IC) coupled to the one or more processors and the network interface controller. The network interface controller couples the server system to a network for remote client access to the server system. The monolithic integrated circuit couples a remote computer system to the server system via the network. The remote computer system includes a remote storage device, a remote display, a remote keyboard, and a remote mouse to allow remote control and management of the server system.

In another embodiment of the invention, an apparatus for remotely managing a computer server is disclosed. The apparatus includes a monolithic integrated circuit (IC) having a server management controller, a network media access controller coupled to the server management controller, a graphics controller, a memory controller coupled to the graphics controller, and a frame grabber engine coupled to the memory controller. The server management controller provides baseboard management control of a computer server. The network media access controller couples the computer server to a wide-area-network (WAN) for remote management of the computer server. The graphics controller receives frames of video data for storage in a frame buffer memory. The memory controller stores the frames of video data in the frame buffer memory. The frame grabber engine determines one or more tiles in a current frame of video data stored in the frame buffer memory that have changed from a previous frame of video data. The one or more tiles with changed video data are communicated through the network media access controller over the wide area network to a remote computer system to construct and display the current frame of video data on a remote display.

In yet another embodiment of the invention, a method of remotely managing a computer server is disclosed. In a monolithic integrated circuit, the method includes monitoring a temperature of the computer server and controlling at least one fan to regulate the temperature of the computer server; monitoring a power supply voltage of the computer server to determine a failure of an element of the computer server; and sharing a frame buffer memory to display a frame of video/graphics data on a local display and a remote display.

In still another embodiment of the invention, a server farm system with local and remote server management is disclosed. The server farm system includes a server farm including a plurality of central processing unit (CPU) servers and a plurality of storage network servers and a remote computer system coupled thereto. Each of the servers in the server farm have a printed circuit board with a network interface controller to couple the server to a network for remote client access and remote management and control of the server; and an integrated intelligent server management chip coupled to the network interface controller. The integrated intelligent server management chip provides local and remote management and control of each respective server. The remote computer system couples to the network interface controller of each server in the server farm through a wide area network. The remote computer system may include a remote display, a remote storage device, a remote keyboard, and a remote mouse to remotely manage and control each of the servers in the server farm.

Server Farm With Server Management

Figure 1:
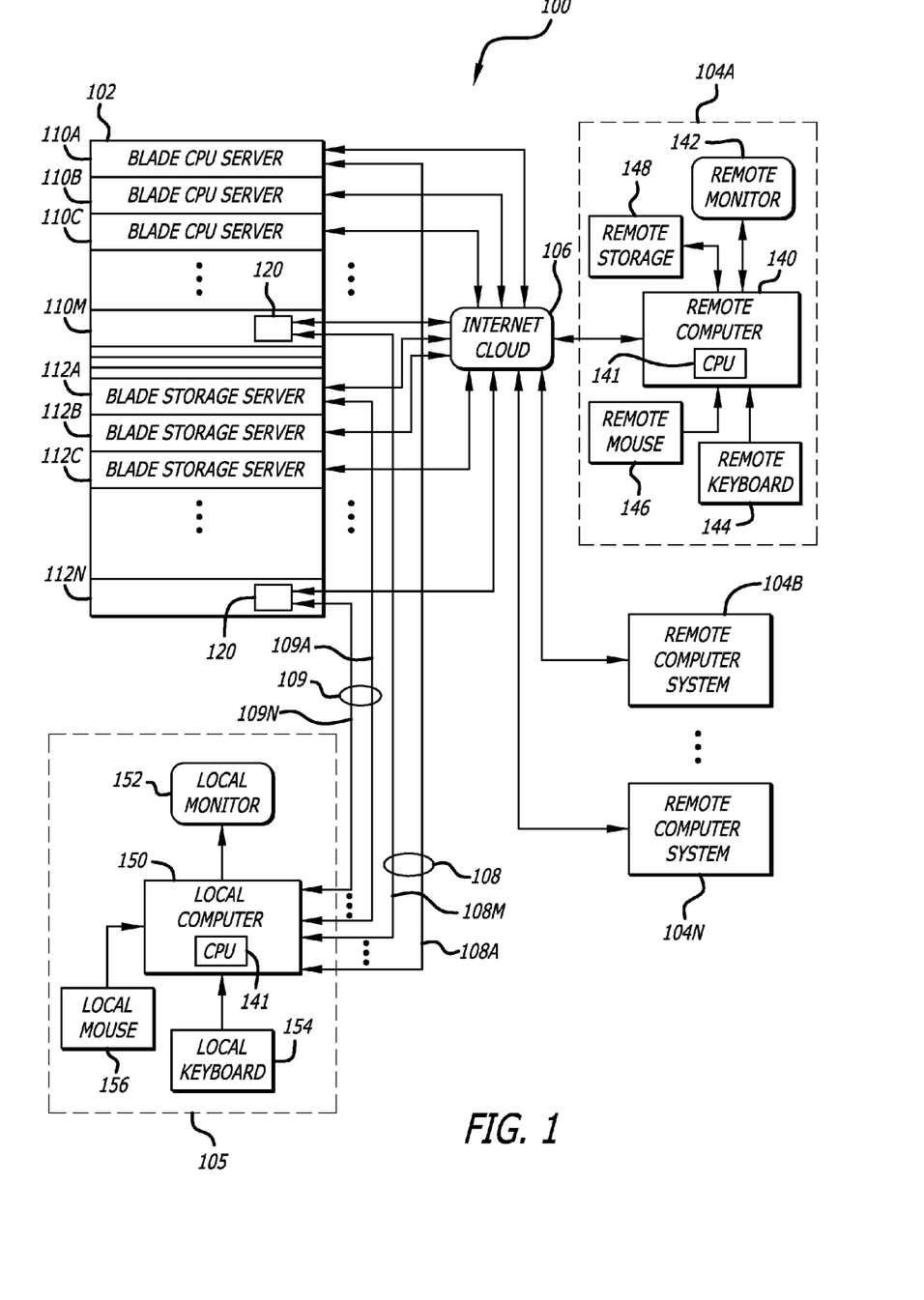
FIG. 1 is a block diagram of a server farm system with local/remote server management in accordance with one embodiment of the invention.

Referring now to FIG. 1, a server farm system 100 is illustrated with local and remote server management in accordance with one embodiment of the invention. The server farm system 100 includes a server farm 102, one or more remote computer systems 104A-104N at remote locations coupled to the server farm 102 via a local area network (LAN) or a wide area network (WAN) 106, such as the internet, and a local computer system 105 coupled to the server farm 102 via a local communication connection 108,109. The local communication connection 108,109 to the server farm 102 may be a local area network connection (LAN) or a serial communication connection, such as RS232 or universal serial bus (USB).

The server farm 102 may include a plurality of central processing unit (CPU) servers 110A-110M and a plurality of storage servers 112A-112N, each including one or more integrated management, graphics, input/output local/remote controller chips 120. The integrated management, graphics, input/output local/remote controller chip 120 may also be referred to as an integrated intelligent global server management chip. The plurality of central processing unit servers 110A-110M and the plurality of storage servers 112A-112N when having a form factor for mounting into a rack may be referred to as blade CPU servers and blade storage servers, respectively. Collectively, the plurality of central processing unit (CPU) servers 110A-110M and the plurality of storage servers 112A-112N may be simply referred to as a server.

The one or more remote computer systems 104A-104N may each include a remote computer 140 with a CPU 141, a remote monitor 142, a remote keyboard 144, a remote mouse 146, and a remote storage device 148 coupled together as shown. The one or more remote computer systems 104A-104N may be considered to be remote clients to the servers as part of a client-server system. Moreover, one or more of the remote computer systems 104A-104N may be used to provide remote management and control of the servers in the server farm. Server management client software may be executed on one or more of the remote computer systems in order to remotely manage and control the servers in the server farm. Additionally, web browser software may be used to executed by the one or more of the remote computer systems in order to gain access to a web site provided by the integrated intelligent global server management chip 120 and remotely manage and control the servers in the server farm.

The local computer system 105 is co-located with the server farm 102 to locally perform server management. That is, the local computer system 105 is located in the same room as the server farm 102. In contrast, the one or more remote computer systems 104A-104N are at remote locations to remotely perform server management. That is, the one or more remote computer systems 104A-104N are in at least a different room in the same building or otherwise in a different building, city, state, or country than the server farm 102.

Figure 2:
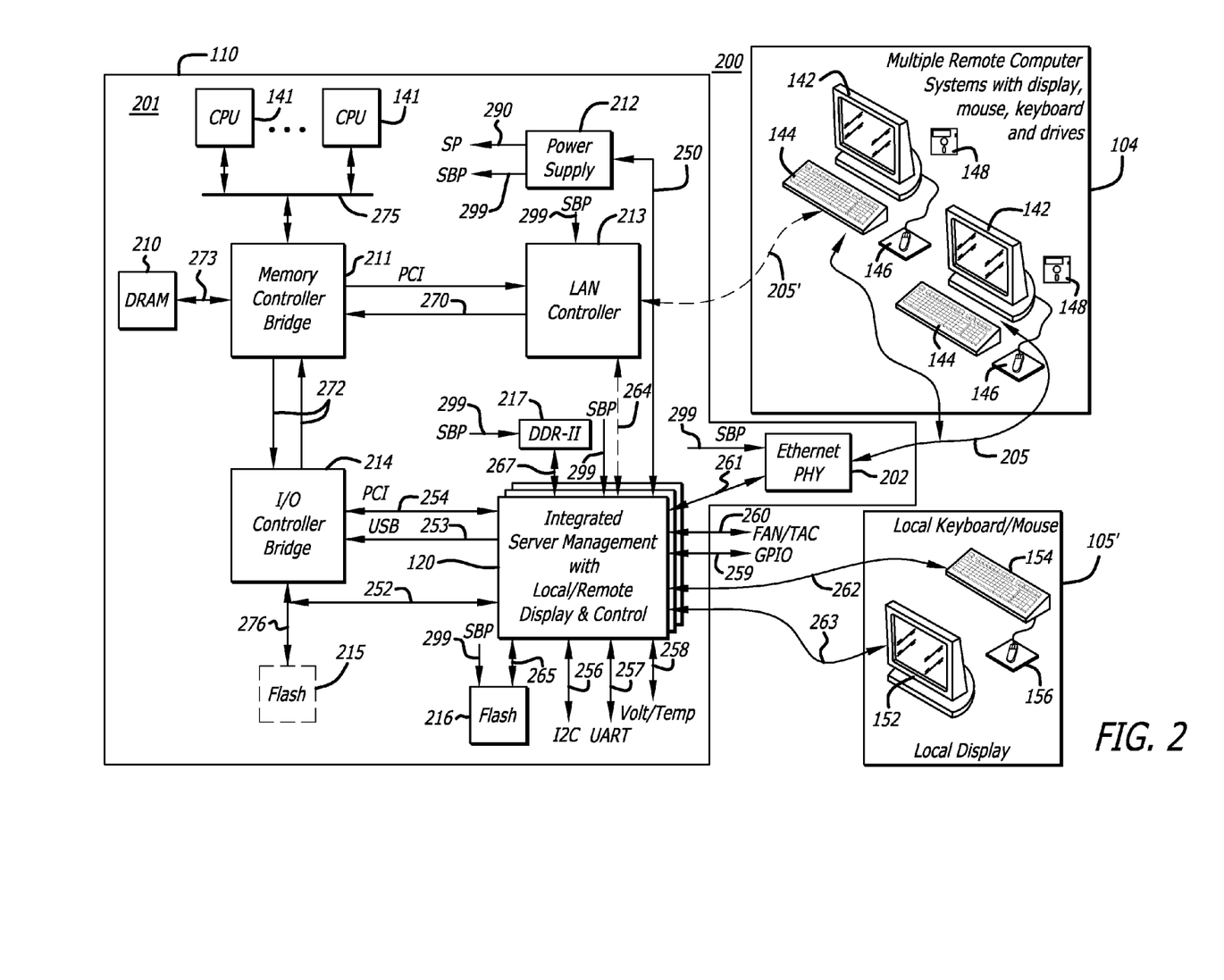
FIG. 2 is a block diagram of a local/remote server management system in accordance with another embodiment of the invention.

The local computer system 105 may include a local computer 150 with a CPU 141, a local monitor 152, a local keyboard 154, and a local mouse 156 coupled together as shown. In one embodiment of the invention, the local computer system 105 does not include the local computer 150 so that the local monitor 152 couples to a graphics controller in the chip 120 of one of the servers 110,112 and the local keyboard 154 and the local mouse 156 couple to an I/O controller in the chip 120. FIG. 2 illustrates a local keyboard/mouse/display system 105', absent the computer 150 and CPU 141, coupled to an integrated management, graphics, input/output local/remote controller chip 120.

Local server management involves provide server management services in the same room as the server farm 102 with the local computer system. In contrast, remote server management involves providing server management services at a remote location via remote keyboard, video, mouse, & storage (KVMS) at a remote computer system in one embodiment of the invention. Generally, server management services may include monitoring, controlling, maintaining, upgrading, failure resolution, downtime prevention, availability, and performance reporting of the server farm, its servers and the components within each server. The integrated management, graphics, input/output local/remote controller chip 120 facilitates remote server management as well as local server management.

Server Management System

Referring now to FIG. 2, a local/remote server management system 200 is illustrated including a server system 110, one or more remote computer systems 104, and a local keyboard/mouse/display system 105' coupled together as shown. The one or more remote computer systems 104 couple to the server system 110 via a wide area network connection 205. The local keyboard/mouse/display system 105' couples to the server system 110 by one or more serial communication links 262-263, such as RS232, a PS/2, or universal serial bus (USB); a serial over local area network (SOL) communication link, and/or by a direct monitor cable carrying analog/digital red-green-blue (RGB) signals.

The server system 110 includes a printed circuit board 201 with a number of integrated circuits mounted thereto, including one or more integrated management, graphics, input/output local/remote controller chips 120 for one or more processors (CPU) 141, respectively. The server system 110 may include the one or more integrated management, graphics, input/output local/remote controller chips 120; the one or more processors (CPU) 141, scratch pad memory DRAM 210, a memory controller 211, a power supply 212, a local area network interface controller (NIC) 213, a physical network interface device 202, an input/output controller 214, an optional non-volatile flash memory 215, a non-volatile flash memory 216, and a frame buffer memory 217 coupled together as shown in FIG. 2. A number of busses 252-254, 270, 272, 273, 275, 276 may be further used to couple elements of the server system 110 together as shown.

The power supply 212 generates a system power (SP) 290 that is provided to a substantial portion of the server system 110 and a standby power (SBP) 299 that is coupled to the one or more integrated management, graphics, input/output local/remote controller chips 120; the network interface controller 213, the non-volatile flash memory 216; the frame buffer memory 217; and a physical network interface device 202. The system power 290 may be switched on and off by the power supply 212 in response to a power supply (PS) control signal 250. The standby power 299 is generated provided that AC power is provided to the power supply 212. The power supply control signal 250 is generated by an integrated management, graphics, input/output local/remote controller chip 120. A power supply control signal 250 may be generated by each of the integrated management, graphics, input/output local/remote controller chips 120 and the power supply 212 may generate more than one system power that is coupled respectively to the one or more processors 141. In this manner, each processor 141 may be selectively powered down and powered back up by a respective power supply control signal 250. While the processors 141 and other elements of the server system may be selectively powered off, the standby power (SBP) 299 coupled to the one or more integrated management, graphics, input/output local/remote controller chips 120; the network interface controller 213, the non-volatile flash memory 216; the frame buffer memory 217; and a physical network interface device 202 keeps them powered up during such periods.

The flash memory 216 coupled to the one or more integrated management, graphics, input/output local/remote controller chips 120 may store software programs for execution by each. In particular, the flash memory 216 stores the basic input/output system (BIOS) software that is used to initialize the chip 120 and other hardware elements of the server 110. The BIOS also controls the boot process of the server 110 and provides low-level input/output routines to modify details of the system's hardware configuration. The contents of the flash memory 216 can be remotely managed to upgrade or program the firmware that is used by the integrated management, graphics, input/output local/remote controller chip 120 and/or to upgrade or program the firmware that is used by the server 110.

The frame buffer memory 217 coupled to the chips 120 is a random access memory for storage of frames of video or graphics display data that may be displayed locally by the local display 152 and/or remotely by one or more remote displays 142. Thus, the frame buffer memory 217 is shared by the local keyboard/mouse/display system 105' or the local computer system 105 and the remote computer systems 104. While an entire frame of video/graphical data may be stored in the frame buffer memory 217, partitioned tiles of the frame having video/graphics data that has changed from the last frame of data may be transmitted by the chip 120 to the remote computer systems 104 while the entire frame of video/graphical data is provided to the local display 152. Note that a portion of the frame buffer memory 217 is also used as a scratch pad memory by the server management controller 310 for executing program instructions and for data storage.

The physical network interface device 202 may be mounted to the printed circuit board 201. Each of the one or more chips 120 may have a network bus 261 that is coupled to the physical network interface device 202 to couple data onto and receive data from the local or wide area network connection 205.

One or more of the remote computer systems 104 may be clients of the server 110 as well and connect through the wide area network connection 205' instead of or in addition to the wide area connection 205. In this case, the integrated management, graphics, input/output local/remote controller chip 120 may optionally couple to the network interface controller 213 via bus 264 so that the remote computer system 104 that is a client may also provide remote server management.

The client connection over the wide area network connection 205' to the server 110 for data processing is typically faster than the wide area network connection 205 for remote server management. Thus, it is desirable to reduce the amount of data transmitted over the wide area network connection 205 to provide a remote KVM capability for remote server management.

The integrated management, graphics, input/output local/remote controller chip 120 couples to a low pin count (LPC) host interface bus 252, one or more universal serial buses (USB1.1 and USB2.0) 253, one or more PCI buses (PCI/PCI Express) 254 of the server system 110 to transmit and receive ("transceive") data with the I/O controller 214. The integrated management, graphics, input/output local/remote controller chip 120 further couples to six serial inter-integrated circuit ($I^2C$) busses 256, five universal asynchronous receiver transmitter busses 257, analog voltage/temperature monitor lines 258, a general purpose input/output (GPIO) bus 259, and fan control/fan tachometer busses 260.

The integrated management, graphics, input/output local/remote controller chip 120 directly monitors the voltage of the system power 290 and the temperature of the server and perhaps the ambient temperature sensed by sensors by way of the analog voltage/temperature monitor lines 258. The integrated management, graphics, input/output local/remote controller chip 120 controls one or more server fans and monitors their fan speeds by means of the fan control/fan tachometer busses 260 in response to the server temperature and perhaps ambient temperature sensed by sensors. The integrated management, graphics, input/output local/remote controller chip 120 can monitor other server parameters by way of coupling to other sensors and circuits through the six serial inter-integrated circuit ($I^2C$) busses 256. A current sensor coupled to the chip 120 may be used to sense the current being provided by the power supply to the server to provide an indication of power consumption for example. An air flow sensor may also be coupled to the chip 120 to monitor the air flow through the server. A humidity sensor may also be coupled to the chip 120 to monitor the humidity of the surrounding air. A smoke detection sensor may also be coupled to the chip 120 to monitor the surroundings of the server for fire in order to protect the operation of and the data stored in the server.

The integrated management, graphics, input/output local/remote controller chip 120 provides an analog and/or digital video/graphics output to couple to the local display 152 by a video/graphics cable 263. The integrated management, graphics, input/output local/remote controller chip 120 further provides a serial interface, such as a universal serial bus, to couple to the local keyboard 154 and the local mouse 156 by one or more serial cables 262.

Referring now to FIGS. 1 and 2, the integrated management, graphics, input/output local/remote controller chip 120 generally provides integrated server management, graphics control for local and remote video, input/output control, and remote keyboard-mouse control. The integrated management, graphics, input/output local/remote controller chip 120 can provide local and remote server management (baseboard management control) in compliance with the intelligent platform management interface (IPMI) standard as well as other server management standards.

To provide remote keyboard-mouse control, the keystrokes on the remote keyboard 144 are sent to the integrated management, graphics, input/output local/remote controller chip 120 so that they take effect locally at one or more of the servers 110,112. The mouse movement and clicks at the remote mouse 146 are sent to the integrated management, graphics, input/output local/remote controller chip 120 so that they take effect locally at one or more of the servers 110,112.

The integrated management, graphics, input/output local/remote controller chip 120 further provides for remote storage. Data stored in the remote storage device 148 can be written to one or more of the servers 110,112. This allows the remote computer system to remotely install a software operating system or software drivers into the one or more servers 110,112 from the remote storage device. Alternatively, data stored in a local data storage device of the one or more servers may be read out and stored into the remote storage device at the remote computer system. For example, a log file stored in one or more of the servers may be stored in the remote data storage device 148 so that operation of a server may be monitored or debugged.

The integrated management, graphics, input/output local/remote controller chip 120 further provides integrated graphics control so that a single graphics controller can provide local video frames of data to the local monitor 152 and changes in the local video frames of data to one or more of the remote computer systems 104A-104N for display on the remote monitor 142. Oftentimes, only a small portion of a video frame changes from one frame to the next. By sending only the changes in the video frame to the remote computer system, the wide area connection between the server farm 102 and the one or more remote computer systems can be of lower quality slow speed connections, such as an Ethernet 10BASE-T connection or digital subscriber line (DSL) modem.

The integrated management, graphics, input/output local/remote controller chip 120 further provides for remote server management of each of the plurality of central processing unit servers 110A-110M and the plurality of storage servers 112A-112N. This is oftentimes referred to as server management, hardware management, baseboard management control, or intelligent platform management. The integrated management, graphics, input/output local/remote controller chip 120 provides an integrated server management controller (also referred to as an integrated baseboard management controller (BMC)) to monitor system sensors to control the server, such as the system temperature to control the system fans, and other events that may cause system failures. The integrated server management controller of the integrated management, graphics, input/output local/remote controller chip 120 also controls the server power supply to provide the ability to remotely shutdown/restart the system for whatever reason including maintenance or overnight power conservation, for example.

The integrated management, graphics, input/output local/remote controller chip 120 further provides for remote power supply control of each of the plurality of central processing unit servers 110A-110M and the plurality of storage servers 112A-112N. An information technology support person at one of the remote computer systems 104A-104N can remotely signal the integrated management, graphics, input/output local/remote controller chip 120 to switch off the power to one or more of the servers in the server farm 102, but for standby power. An information technology support person at one of the remote computer systems 104A-104N can also remotely signal the integrated management, graphics, input/output local/remote controller chip 120 to switch on the power to one or more of the servers in the server farm 102. This remote power off and on capability may be useful to reboot an operating system for whatever reason, such as for software upgrades.

Integrated Management, Graphics, Input/Output Local/Remote Controller Chip

Figure 3:
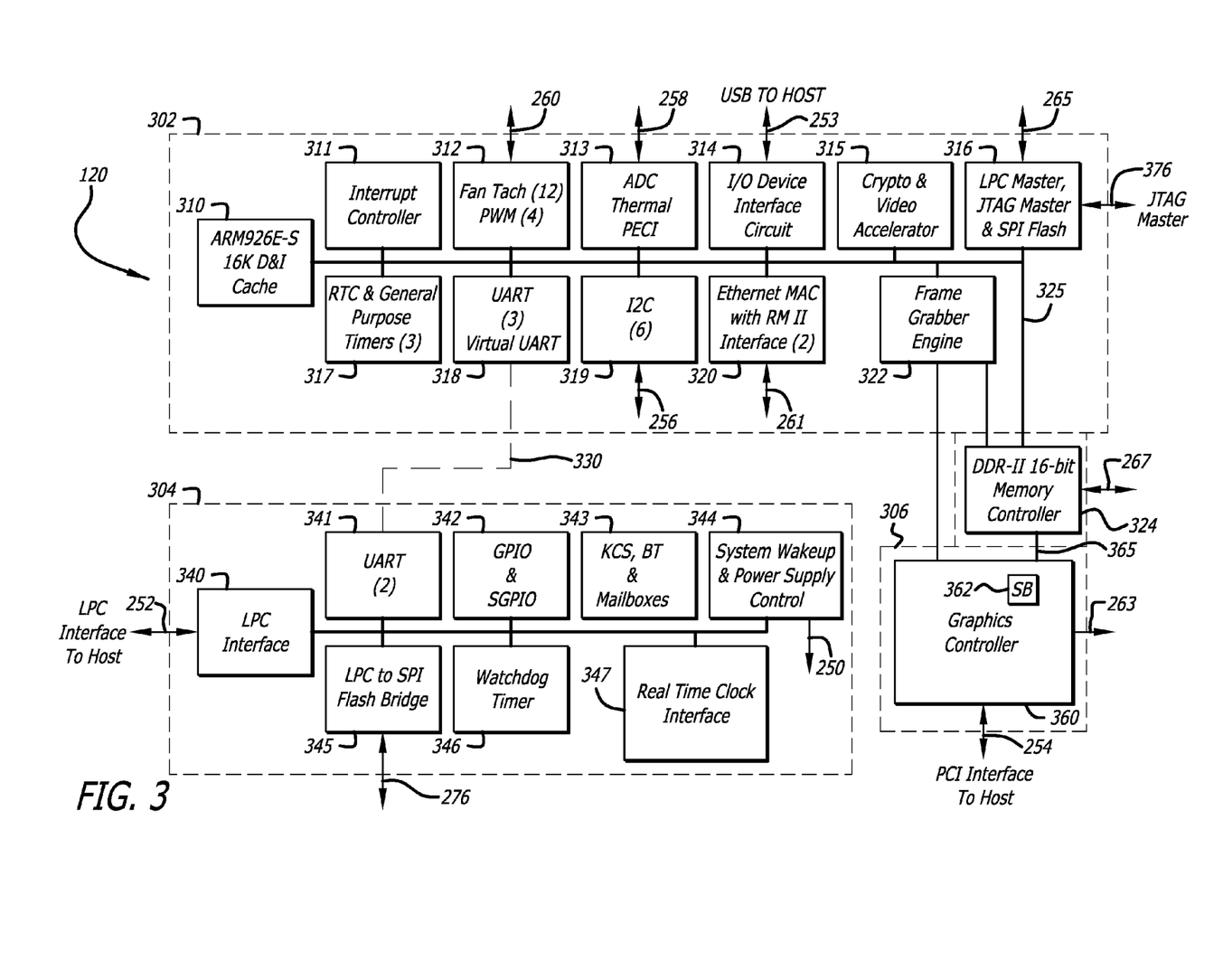
FIG. 3 is a block diagram of an integrated management, graphics, input/output local/remote controller chip in accordance with another embodiment of the invention.

Referring now to FIG. 3, a functional block diagram of the integrated management, graphics, input/output local/remote controller chip 120 is illustrated. The integrated management, graphics, input/output local/remote controller chip 120 is a single monolithic integrated circuit including functional blocks and subsystems in a single semiconductor substrate. That is, the integrated management, graphics, input/output local/remote controller chip 120 provides its functionality in a single chip solution.

The integrated management, graphics, input/output local/remote controller chip 120 includes a server management and remote KVM subsystem 302, a super input/output subsystem 304, and a graphics subsystem 306. The integrated management, graphics, input/output local/remote controller chip 120 includes a memory controller functional block 324 that is shared by the server management & remote KVM subsystem 302 as well as the graphics subsystem 306.

Referring now to FIG. 3 and FIG. 2, the memory controller 324 couples to the frame buffer memory 217 via a memory bus 267. In one embodiment of the invention, the memory 217 is type II DDR dynamic random access memory (DRAM) and the memory controller 324 is a sixteen bit type II DDR memory controller. The shared memory controller 324 allows for the frame buffer memory 217 to readily share its digital data in a digital pixel format with the one or more remote computer systems 104 and the local keyboard/mouse/display system 105' or the local computer system 105. In this manner, the frame buffer memory 217 is a unified memory that can provide support to multiple remote clients in a cost effective way.

The server management & remote KVM subsystem 302 further includes a server management controller 310, including a RISC processor core by Advanced Risc Machines Ltd. (ARM) and memory; an interrupt controller 311, an analog to digital converter 313 for voltage and temperature monitoring; an input/output device interface circuit 314 such as a universal serial bus (USB) interface circuit for USB1.1 and USB2.0; a cryptographer and video accelerator 315; a low pin count (LPC) master, a joint test action group (JTAG) test master, and flash memory serial peripheral interface (SPI) 316; real-time-clock (RTC) and general purpose timers 317; a plurality of universal asynchronous receive transmitters (UARTs) and a virtual UART 318; a plurality of inter-integrated circuit ("i-squared-c") interfaces 319; at least two Ethernet media access controllers 320 with a media independent interface (RMII) to couple to the physical (PHY) interface 202; and a frame grabber engine 322.

The server management controller 310 is a micro-controller that is programmed by its memory to provide baseboard management control. Thus, the server management controller 310 may also be referred to as a baseboard management controller. The server management controller 310 monitors the system temperature and controls the system fans. The server management controller 310 further monitors other events that may cause server system failures. The server management controller 310 further controls a system wakeup and power supply controller 344 to generate the power supply control signal 250 so that the server system can be substantially shutdown and restarted.

The frame grabber engine 322 couples to the memory controller 324 and the shared graphics controller 360 of the graphics subsystem 306. The frame grabber engine 322 may be used to partition a frame into tiles of data within the frame. The frame grabber engine 322 may be used to determine what tiles of a current frame have video/graphics data that has changed from the last frame. The identified changed tiles within a frame of data may then be compressed, packetized, and transmitted by the chip 120 to the remote computer systems 104 by way of the wide area network.

With a plurality of media access controllers 320, multiple clients at one or more remote computer systems 104 may connect simultaneously and view and manage one or more server systems 110 over a wide area network. Additionally, the Ethernet media access controllers 320 provide the remote connection for the remote computer systems 104 to the server management & remote KVM subsystem 302 and its elements. Key strokes and mouse movements/clicks are sent as packets from the remote computer system over the network to the Ethernet media access controller 320. The server management controller 310 processes these packets and presents key strokes and mouse movements/clicks to bus controller 314 and the host CPU via the USB interface 253 as though they were USB based keyboard/mouse commands. Remote storage devices 148 may also be presented by the bus controller 314 to the host CPU via the USB interface 253 as being USB based storage devices. The remote computer systems 104 can remotely install an operating system or drivers from the remote storage device 148 into the hard disk storage or any non-volatile storage 216 of the server by means of the Ethernet media access controller 320 and flash SPI interface 316. Additionally, the server management & remote KVM subsystem 302 and the media access controllers 320 allow a local audio stream on a universal serial bus from a microphone to be communicated to a remote client over the wide area network. Each of the media access controllers 320 may also be referred to as a network interface.

The super I/O subsystem 304 integrates together a number of communication interfaces of the server including a local USB keyboard and mouse interface for a local USB keyboard and USB mouse, and an RS232 communications interface via one or more universal asynchronous receiver transmitters for a local computer 105. The super I/O subsystem 304 provides a plurality of general purpose input/output ports and a bridge to the Basic Input/Output System (BIOS) stored in the flash memory 216. Moreover, the super I/O subsystem 304 provides an interface with the server management controller 310 of the server management & remote KVM subsystem 302. The super I/O subsystem 304 may also interface with the server management & remote KVM subsystem 302 to transparently send communications over a UART to a remote computer system 104 through the network media access controller 320 by way of the wide area network connection 261, 205.

The super I/O subsystem 304 includes a low pin count (LPC) interface 340; a plurality of universal asynchronous receive transmitters (UARTs) 341; general purpose input/output (GPIO) and serial general purpose input/output (SG-PIO) interfaces 342; keyboard style interface controller (KCS), block transfer (BT) & mailbox controller 342; a system wakeup and power supply controller 344; an LPC to flash memory serial peripheral interface (SPI) bridge 345 to couple to one or more SPI flash memory devices 216; a watchdog timer 346; and a real time clock (RTC) interface 347 coupled together as shown in FIG. 3. One of the UARTs 341 of the super I/O subsystem 304 may be selectively coupled to the virtual UART 318 of the BMC & KVMS subsystem 302 by means of a selective serial communication connection 330 so that the host system may communicate using a serial communication protocol with one of the remote computer systems 104.

The system wakeup and power supply controller 344 generates the power supply control signal 250 to provide the capability to remotely shutdown/restart the system.

As mentioned previously, the graphics subsystem 306 further includes the shared graphics controller 360 that is coupled to the memory controller 324 and the frame grabber engine 322. The graphics controller 360 further interfaces to the PCI/PCI express bus 254 to couple to the one or more host processors 141 and read and write into the memory 210 in order to obtain a frame of video/graphics data for display.

Generally, the graphics subsystem 306 provides the graphics controller 360 so that frames of video/graphical data may be displayed on the local monitor 152 via the video/graphics output 263. However when remote server management is taking place at a remote computer 104, it may be desirable to turn off the local display 152 for security reasons as well as to save memory bandwidth used by the graphics controller 360 for the local display. The graphics controller includes a security bit (SB) 362 that may be set by a support person at a remote computer system 104 over the wide area network connection 205. In response to the security bit 362, the graphics controller 360 turns off the video/graphics output 263 to the local display 152. Additionally, the graphics controller 360 avoids reading data from the frame buffer memory 217 such that data traffic on the bus 365 and bus 267 is reduced thereby conserving memory bandwidth and power.

Conclusion

When elements are implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Rather, the embodiments of the invention should be construed according to the claims that follow below.

What is claimed is:

1. An integrated server system for data processing, the integrated server system comprising:
　a printed circuit board including
　　a plurality of processors to process data to serve one or more clients;
　　a network interface controller coupled to the one or more processors, the network interface controller configured to couple the server to a network for remote client access to the server; and
　　a monolithic integrated circuit (IC) coupled to the plurality of processors and the network interface controller, the monolithic integrated circuit configured to couple to a remote computer system including a remote storage device, a remote display, a remote keyboard, and a remote mouse to provide remote control and management of the integrated server system, the monolithic integrated circuit further configured to couple to a local computer system to provide local control and management of the integrated server system.

2. The integrated server system of claim 1, wherein the remote control and management of the integrated server system provided by the monolithic integrated circuit includes
powering off one or more of the plurality of processors.

3. The integrated server system of claim 2, wherein the remote control and management of the integrated server system provided by the monolithic integrated circuit includes
powering back on the one or more of the plurality of processors.

4. The integrated server system of claim 1, wherein the remote control and management of the integrated server system provided by the monolithic integrated circuit includes
resetting or rebooting the integrated server system;
booting the integrated server system using the remote storage device;
upgrading, installing or debugging software on the integrated server system; and
selectively turning on and off hardware interfaces within the integrated server system.

5. The integrated server system of claim 1, further comprising:
an Ethernet physical layer controller coupled to the monolithic integrated circuit, the Ethernet physical layer controller to couple the monolithic integrated circuit to the remote computer system over a wide area network.

6. The integrated server system of claim 5, wherein the wide area network is the internet.

7. The integrated server system of claim 1, further comprising
shared memory storage coupled to the monolithic integrated circuit, the shared memory storage to provide local graphics display, management and control of the integrated server system, and to interface the integrated server system to the remote computer system.

8. The integrated server system of claim 1, further comprising:
a memory controller bridge coupled between the network interface controller and the one or more processors; and
second memory storage coupled to the memory controller,
wherein the memory controller to control the storage of data in the second memory storage and the flow of data to the one or more processors.

9. The integrated server system of claim 8, further comprising:
an input-output (IO) controller bridge coupled between the memory controller bridge and the monolithic integrated circuit, the IO controller bridge to control the flow of data between the memory controller bridge and the monolithic integrated circuit.

10. The integrated server system of claim 1, further comprising:
a flash memory coupled to the monolithic integrated circuit, the flash memory to non-destructively store boot software for the server system.

11. An integrated server system comprising:
a printed circuit board including
one or more processors to process data to serve clients;
a network interface controller coupled to the one or more processors, the network interface controller configured to couple the server to a network for remote client access to the server;
a monolithic integrated circuit (IC) coupled to the one or more processors and the network interface controller, the monolithic integrated circuit configured to couple to a remote computer system including a remote storage device, a remote display, a remote keyboard, and a remote mouse to provide remote control and management of the integrated server system;
a power supply to generate system power and standby power, the power supply coupled to the monolithic integrated circuit to receive a control signal and provide the standby power to the monolithic integrated circuit, the power supply to power off and power on the system power in response to the control signal to selectively power off and power on the one or more processors respectively; and
wherein the monolithic integrated circuit further to generate the control signal to selectively power off and power on the one or more processors and to receive the standby power to remain powered up while the one or more processors of the integrated server system are powered off.

12. The integrated server system of claim 1, wherein the monolithic integrated circuit includes
a graphics controller to display graphics data on a local display;
a frame grabber to capture tiles of changing graphics data within each frame of graphics data, wherein a tile is rectangular subset of a frame of pixels;
a controller to provide baseboard management control of the integrated server system;
a system wakeup controller to generate the control signal to power off and power on system power;
a memory controller coupled to the graphics controller and the frame grabber, the memory controller to share data in a frame buffer memory with the graphics controller to display a video frame on a local display and the frame grabber to display the video frame on a remote display.

13. An apparatus for remotely managing a computer server, the apparatus comprising:
a monolithic integrated circuit (IC) having
a server management controller to provide baseboard management control of a computer server;
a network media access controller coupled to the server management controller, the network media access controller to couple the computer server to a wide-area-network (WAN) for remote management of the computer server;
a graphics controller to receive frames of video data for storage in a frame buffer memory;
a memory controller coupled to the graphics controller, the memory controller to store the frames of video data in the frame buffer memory;
a frame grabber engine coupled to the memory controller, the frame grabber engine to read out video data stored in the frame buffer memory for display on a remote display of a remote computer system; and
wherein the graphics controller further to selectively read out video data stored in the frame buffer memory for display on a local display of a local computer system such that the frame buffer memory is a shared memory.

14. The apparatus of claim 13, wherein
the frame grabber engine further to determine one or more tiles in a current frame of video data stored in the frame buffer memory that have changed from a previous frame of video data; and the one or more tiles with changed video data are to be communicated through the network media access controller over the wide area network to the remote computer system to construct and display the current frame of video data on the remote display.

15. The apparatus of claim 13, wherein
the monolithic integrated circuit further includes
a system wakeup and power supply controller to generate a power supply control signal to substantially power off the computer server in response to a power off request from the remote computer system.

16. The apparatus of claim 15, wherein
the system wakeup and power supply controller to further generate the power supply control signal to substantially power on the computer server in response to a power on request from the remote computer system.

17. The apparatus of claim 13, wherein
commands of a remote keyboard and a remote mouse are communicated to the controller over the wide area network through the network media access controller for remote management of the computer server.

18. The apparatus of claim 13, wherein
the monolithic integrated circuit further includes
a serial flash memory interface to couple to a flash memory to read basic input/output system software and initialize the monolith integrated circuit.

19. A method of remotely managing a computer server, the method comprising:
in a monolithic integrated circuit,
monitoring a temperature of the computer server and controlling at least one fan to regulate the temperature of the computer server;
monitoring a power supply voltage of the computer server to determine a failure of an element of the computer server; and
sharing a frame buffer memory to display a frame of video/graphics data on a local display and a remote display.

20. The method of claim 19, further comprising:
in the monolithic integrated circuit,
determining changed tiles of n by m pixels in a frame of video data, a changed tile including one or more pixel changes in a current frame of video data form a prior frame of video data.

21. The method of claim 19, further comprising:
in the monolithic integrated circuit,
setting a security bit; and
turning off a local video data output to avoid displaying frames of video data on the local display to reduce memory bandwidth, conserve power, and provide data security.

22. The method of claim 19, further comprising:
in the monolithic integrated circuit,
receiving a request to shut down the computer server; and
generating a power supply control signal to turn off a system power to substantially power down the computer server in response to the request.

23. The method of claim 19, further comprising:
in the monolithic integrated circuit,
receiving a request to restart the computer server;
generating a power supply control signal to turn off a system power to substantially power down the computer server in response to the request; and
generating the power supply control signal to turn on the system power to power up the computer server in response to the request.

24. The method of claim 19, wherein
the frame of video/graphics data includes information regarding the temperature and power supply voltage of the computer server.

25. The method of claim 19, further comprising:
transmitting a portion of the frame of video/graphics data through a media access controller into a wide area network for display on a remote display.

26. The method of claim 25, further comprising:
receiving a keyboard command through the media access controller and the wide area network from a remote keyboard to control the computer server.

27. The method of claim 26, further comprising:
receiving a mouse command through the media access controller and the wide area network from a remote mouse to control the computer server.

28. The method of claim 27, further comprising:
receiving software through the media access controller and the wide area network from a remote storage device to upgrade the software in the computer server.

29. A server farm system with local and remote server management, the server farm system comprising:
a server farm including a plurality of central processing unit (CPU) servers and a plurality of storage network servers, each server of the plurality of central processing unit (CPU) servers and the plurality of storage network servers having
a printed circuit board with
one or more processors to process data to serve one or more clients,
a network interface controller to couple the server to a network for remote client access and remote management and control of the server; and
an integrated intelligent server management chip coupled to the one or more processors and the network interface controller, the integrated intelligent server management chip configured to provide local and remote management and control of the server; and
a remote computer system coupled to the network interface controller of each server in the server farm through a wide area network, the remote computer system including a remote display, a remote keyboard, and a remote mouse to remotely manage and control each of the servers in the server farm.

30. The server farm system of claim 29, further comprising:
a local computer system coupled to the integrated intelligent server management chip of at least one of the servers of the server farm, the local computer system including a local display, a local keyboard, and a local mouse to locally manage and control each of the servers in the server farm.

31. The server farm system of claim 30, wherein
the printed circuit board in each of the servers further has
a shared frame buffer memory coupled to the integrated intelligent server management chip to store one or more frames of graphics data, the shared frame buffer memory to provide graphics data for mirrored display on the local display of the local computer system and the remote display of the remote computer system over the wide area network, and
the integrated intelligent server management chip has
a shared memory controller coupled to the shared frame buffer memory to read and write pixel data with the shared frame buffer memory, a graphics controller coupled to the shared memory controller to control the display of graphics data on the local display of the local computer, and a frame grabber coupled to the shared memory controller to display graphics data on the remote display of the remote computer over the wide area network.

32. The server farm system of claim 30, wherein the printed circuit board in each of the servers further has a power supply configured to generate standby power for the server and selectively generate system power for the server, the power supply to selectively generate the system power in response to a power supply control signal, and the integrated intelligent server management chip coupled to the power supply to receive standby power, the integrated intelligent server management chip having a system wakeup controller to generate the power supply control signal in response to a request by a user at the remote computer, the power supply control signal to switch the system power to the server off and on to reboot the server.

33. The integrated server system of claim 1, wherein the local computer system includes a local display, a local keyboard, and a local mouse.

34. The integrated server system of claim 11, further comprising shared memory storage coupled to the monolithic integrated circuit, the shared memory storage to provide local graphics display, management and control of the server system, and to interface the server system to the remote computer system.

35. The integrated server system of claim 34, wherein the monolithic integrated circuit includes a graphics controller to display graphics data on a local display;

a frame grabber to capture tiles of changing graphics data within each frame of graphics data, wherein a tile is rectangular subset of a frame of pixels;

a controller to provide baseboard management control of the integrated server system;

a system wakeup controller to generate the control signal to power off and power on system power;

a memory controller coupled to the graphics controller and the frame grabber, the memory controller to share data in a frame buffer memory with the graphics controller to display a video frame on a local display and the frame grabber to display the video frame on a remote display.

36. The integrated server system of claim 11, further comprising:

a flash memory coupled to the monolithic integrated circuit, the flash memory to non-destructively store boot software for the integrated server system.

* * * * *